US009288696B2

(12) United States Patent
Szini et al.

(10) Patent No.: US 9,288,696 B2
(45) Date of Patent: Mar. 15, 2016

(54) METHOD AND APPARATUS FOR WIRELESS DEVICE PERFORMANCE TESTING

(71) Applicant: Google Technology Holdings LLC, Mountain View, CA (US)

(72) Inventors: Istvan J. Szini, Grayslake, IL (US); Eric L. Krenz, Crystal Lake, IL (US); John R. Peters, Maple Park, IL (US)

(73) Assignee: Google Technology Holdings LLC, Mountain View, CA (US)

(*) Notice: Subject to any disclaimer, the term of this patent is extended or adjusted under 35 U.S.C. 154(b) by 112 days.

(21) Appl. No.: 14/086,572

(22) Filed: Nov. 21, 2013

(65) Prior Publication Data

US 2015/0099473 A1    Apr. 9, 2015

Related U.S. Application Data

(60) Provisional application No. 61/887,345, filed on Oct. 5, 2013.

(51) Int. Cl.
*H04B 17/00*    (2015.01)
*H04W 24/06*    (2009.01)
*H04B 17/391*   (2015.01)
*H04W 88/02*    (2009.01)

(52) U.S. Cl.
CPC .............. *H04W 24/06* (2013.01); *H04B 17/00* (2013.01); *H04B 17/391* (2013.01); *H04W 88/02* (2013.01)

(58) Field of Classification Search
CPC .............. H04W 24/06; H04B 17/0087; H04B 17/0095
USPC ............. 455/67.11, 67.12, 67.14, 103, 115.1, 455/115.2, 226.1
See application file for complete search history.

(56) References Cited

U.S. PATENT DOCUMENTS

| 2008/0056131 | A1* | 3/2008 | Balakrishnan et al. | 370/232 |
| 2011/0084887 | A1  | 4/2011 | Mow et al. | |
| 2011/0299570 | A1* | 12/2011 | Reed | 375/130 |
| 2013/0315321 | A1* | 11/2013 | Rajagopal et al. | 375/260 |

OTHER PUBLICATIONS

Wei Fan et al., Emulating Spatial Characteristics of MIMO Channels for OTA Testing, IEEE Transactions on Antennas and Propagation, Aug. 2013, All Pages, vol. 61, No. 8.
Wei Fan et al., "Channel Spatial Correlation Reconstruction in Flexible Multi-Probe Setups", Antennas and Wireless Propagation Letters, IEE (vol. 12), Jan. 14, 2014, All Pages.
Fan, Wei et al."3D Channel Model Emulation in a MIMO OTA Setup". I E E E V T S Vehicular Technology Conference. Proceedings. 2013, all pages.
Jeffrey Fordham, "A Cylindrical Near-Field Vs. Spearical Near-Field Antenna Test Comparison", Antenna Measurements and SAR, 2004, AMS 2004, IEEE, all pages.
Rainer Wansch, Electrically Small Antennas, Measurement Concepts, Fraunhofer Institut Integrierte Schaltungen, Feb. 6, 2008, all pages.

* cited by examiner

*Primary Examiner* — Tuan Pham
(74) *Attorney, Agent, or Firm* — Faegre Baker Daniels LLP (57) ABSTRACT

A method and apparatus for obtaining a set of optimized angles of arrival for a corresponding set of radio links. The set of radio links model a radio environment of a wireless unit operating at a particular location within in a radio system. Each radio link represents a different propagation path between the wireless unit and transmitting antenna operating within the radio system. Each optimized angle of arrival represents an angle of arrival of one radio link with reference to the wireless unit. Each probe antenna of a set of probe antennas is positioned at a corresponding angle of the set of optimized angles of arrival. A corresponding set of probe radio signals is transmitted from the set of probe antennas.

16 Claims, 7 Drawing Sheets

Prior Art

- 705: OBTAIN A SET OF OPTIMIZED ANGLES OF ARRIVAL FOR A CORRESPONDING SET OF RADIO LINKS
- 710: POSITION A CORRESPONDING SET OF PROBE ANTENNAS AT AT THE OPTIMIZED ANGLES OF ARRIVAL
- 715: TRANSMIT A SET OF RADIO SIGNALS FROM THE SET OF PROBE ANTENNAS

- 805: POSITION A UNIT UNDER TEST AT A TEST POSITION WITHIN AN ANECHOIC CHAMBER
- 810: OBTAIN A SET OF OPTIMIZED ANGLES OF ARRIVAL FOR A DROP
- 815: POSITION A CORRESPONDING SET OF PROBE ANTENNAS WITHIN THE ANECHOIC CHAMBER
- 820: TRANSMIT A CORRESPONDING SET OF PROBE RADIO SIGNALS FROM THE SET OF PROBE ANTENNAS

905
DETERMINE THE OPTIMIZED ANGLES OF ARRIVAL USING A ONE OF A MATHEMATICAL MODEL OF A RADIO SYSTEM AND A CHANNEL MODEL

1005
GENERATE EACH RADIO SIGNAL BY MODIFYING THE SIGNAL CHARACTERISTICS OF A TEST RADIO SIGNAL, THE MODIFICATION BEING DERIVED FROM A CHANNEL MODEL.

1105
DERIVE THE OPTIMIZED ANGLE OF ARRIVAL OF A RADIAL LINK FROM ANGLES OF ARRIVAL OF ONE OR MORE SUB-PATHS IN A CLUSTER OF SUB-PATHS OF THE RADIO LINK

FIG. 11

METHOD AND APPARATUS FOR WIRELESS DEVICE PERFORMANCE TESTING

FIELD OF THE INVENTION

The present invention relates generally to electromagnetic communications, and more specifically to determining wireless device performance using standardized system modeling.

BACKGROUND

Standardized radio system modeling has been used extensively for determining the performance of wireless units, such as vehicular phones, cell phones, laptops, and wireless tablets. Standardized radio system testing provides for comparison of different models of wireless devices and can be useful during development of wireless devices when the standardized system model sufficiently models the real world environment. As systems have become more sophisticated, so have the standardized radio system models. Today there are well defined radio system models that use two dimensional modeling, wherein a wireless device under test is placed at a test position within an anechoic chamber that has a plurality of probe antennas placed at regular intervals at 90 degrees elevation and 360 degrees azimuth with reference to a normal position of the wireless device under test. (Note that for this document an elevation angle of zero is along an upper half of an axis that is vertical with reference to the horizontal plane.) With the increasing use of multiple-input-multiple-output antennas within devices, more complex mathematical algorithms are proposed to model the radio systems using radio propagation channels in three dimensional models. This results in greater numbers of antenna probes within anechoic test chambers that have been proposed to improve the modeling of the real world environment. The greater number of antenna probes includes probe antennas that are placed anywhere within the full elevation range of 0 to 180 degrees, that are not used in two dimensional models, and at smaller azimuth angular intervals One result of more antenna probes is the need for a larger anechoic chamber to reduce antenna coupling to limits. The increased size and complexity of the test setups can cost substantially more per unit test to run than earlier test systems.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the following embodiments, it should be observed that the embodiments reside primarily in combinations of method steps and apparatus components related to testing of wireless devices in an anechoic chamber, in which a minimum number of antenna probes transmit modified forms of a particular test signal to a device under test. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
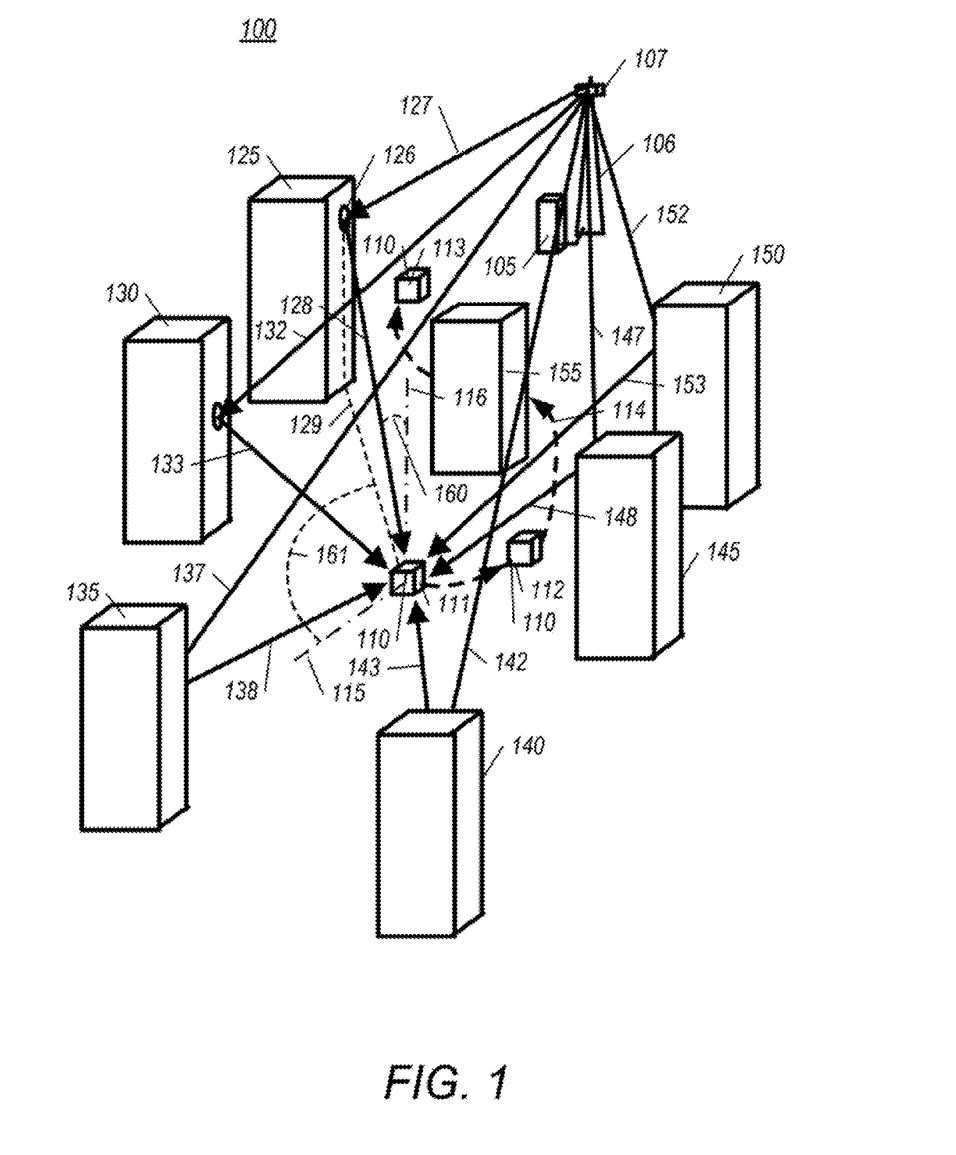
FIG. 1 is a geometric block diagram of a wireless system that is used as a basis of modeling radio signal propagation in the wireless system, in accordance with certain embodiments.

Referring to FIG. 1, a geometric block diagram of a radio system model 100 that is used as a basis of modeling radio signal propagation in actual radio systems is shown, in accordance with certain embodiments. The radio system model 100 may closely represent an actual radio system or may be a channel model of a type of radio system. The characteristics of propagation of the transmitted radio energy in these radio system models are commonly referred to as the channel model. Channel models have been defined for environments such as an urban micro-cell (which FIG. 1 represents), an indoor micro-cell a suburban macro-cell, or a rural macro-cell. The modeling of radio signal propagation in some embodiments is provided for radio energy that propagates from one transceiver 105 to one wireless unit 110. The wireless unit can be any wireless device. The wireless unit may be any client device, of which just a few example are a cellular phone, a vehicular communication device, a PC or a tablet. In some cases the wireless device may not be considered a client device, such as a node of a local area network. Some of these embodiments are described in standardized channel models used in a channel modeling process for wireless unit test procedures, such as channel models and processes described in Chapter 5 of "MIMO Signal Processing", Sebastian Miron (Ed.), ISBN: 978-953-7619-91-6, InTech. Chapter 5, "MIMO Channel Modelling" was authored by Faisal Darbari, Robert W. Stewart and Ian A. Glover of the University of Strathclyde, Galsgow, United Kingdom. Included in Chapter 5 are descriptions of newer radio system models such as SCME (extended spatial channel model), WINNER II, as well as some older models. These standardized channel models are included in specifications or documents issued by agencies such as CTIA, 3GPP, and WINNER. CTIA refers to "CTIA—the Wireless Association" located at 1400 16th Street, NW, Suite 600 Washington, D.C. 20036. 3GPP refers to the 3rd Generation Partnership Project, having a location at 3GPP Mobile Competence Centre, c/o ETSI, 650, route des Lucioles, 06921 Sophia-Antipolis Cedex, France. WINNER is a consortium co-ordinated from Nokia Siemens Networks GmbH and Co. KG, SN MN PG NT RA, St. Martinstrasse 76, 81617 Munich, Germany. These channel modeling processes may use random selection techniques to perform many instances of channel propagation emulation in order to determine the performance of a wireless unit in a particular channel model (e.g., an urban micro-cell)

It will appreciated that these radio system models are not only useful in methods used for testing wireless units to determine their performance according to published standards; these radio system models may alternatively be used for other purposes, such as optimizing the locations of a wireless unit and transceiver relative to each other when both units are going to operated in fixed positions.

Referring again to FIG. 1, in some embodiments the radio signal received at the wireless unit is analyzed for a situation of the wireless unit in which the wireless unit is moving at defined speeds and directions within the radio system, using a particular channel model. In FIG. 1, a wireless unit 110 is shown as moving along a path 114 that is shown as a dashed line starting at location 111, curving behind a building 155, and ending at location 113. The radio energy received by the wireless unit 110 along the path 114 can be modeled as a set of radio links that include clusters of rays, or sub-paths. Each ray is affected by an environment that is characterized by a variety of propagation parameters. The channel model defines some of these propagation parameters. Some of the propagation parameters are classified as large scale parameters, which are parameters that do not change significantly over distances of a few tens of wavelengths, and therefore for which an average value may be used. Other propagation parameters may vary within distances of a few tens of wavelengths. In order to provide tractable analysis of the performance of a wireless unit operating in a particular channel model, a concept is used in some embodiments that is called a drop, which reduces the distance and time over which the channel model is analyzed to near zero. Propagation parameters are determined from the channel model for each drop and many drops are simulated to determine the performance of the wireless unit in the system model for the channel model.

Three drops for the wireless unit 110 are shown in FIG. 1 as wireless drops 111, 112, and 113. There may be a plurality of drops at one wireless location, representing changing characteristics of the radio propagation at various times at the one location. The links for the wireless unit when at location 111 are illustrated in FIG. 1. Energy is radiated from the antenna 107 of transceiver 105. (The antenna 107 is mounted on tower or base station 106.) Some of the energy arrives at the wireless unit 110 along each of six multipath routes, each of which involves a reflection. Each reflection is modeled as being at a particular position on buildings 125, 130, 135, 140, 145, 150. There is no multipath to the wireless unit 110 at location 111 for building 155; it is blocking a direct line of sight path to the wireless unit. The positions on the buildings are such that the reflected energy arrives at the wireless unit 110. One of the paths comprises path 127 from the antenna 107 to a position 126 on the building 125, then path 128 from the position 126 to the wireless unit 110 at location 111. The energy arriving that is reflected off of position 126 on building 125 arrives at a specific angle with reference to the wireless unit 110. This is the angle of arrival of the energy.

The effects of the environment on this energy are modeled in the form of a radio link conveying energy at the angle of arrival of the path 128. The radio link is characterized by propagation parameters of the channel model that modify the energy transmitted by antenna 107, for a particular drop (i.e., for the particular location of the wireless unit, the particular angle of arrival, and the particular time of the drop). The values of the propagation parameters correspond to conditions that would occur along paths 127 and 128 in the type of environment being modeled (e.g., the amplitude may be modified for range and fading effects). The energy received at the wireless unit 110 for this channel model is reduced to six or fewer radio links having different propagation characteristics and each having an associated angle of arrival at the wireless unit 110.

The angle of arrival for the radio link 127-128 is the angle of path 128 with reference to the wireless unit 110 at location 111, as shown in FIG. 1. This angle of arrival has an azimuth angle 161 and an elevation angle 160. In this example there is a horizontal plane that common to the base of the wireless unit 100 and the buildings 125, 130, 135, 140, 145, 150. An azimuth axis 125 that is within the horizontal plane is defined relative to the wireless unit 110 (at a corner of the base of the wireless unit 110). The azimuth angle 161 is the angle between the projection 129 of path 128 onto the horizontal plane and the azimuth axis 125. The elevation angle 160 is the angle between the path 128 and an axis that is perpendicular to the horizontal plane at the corner of the base of the wireless unit 110. Each of the links 132-133, 137-138, 142-143, 147-148, 152-153 has a (typically different) angle of arrival for the drop of wireless unit 110 at location 111. These angles of arrival are determined using the same wireless unit based coordinate system. Wireless unit 110 will also have additional sets of up to six links, each having an associated angle of arrival, for every drop, including drops 112 and 113. The coordinate system used to define the angles of arrival need not be the same as the one described for this example, where it is a polar coordinate system with a plane of 90 degree elevation (a horizontal plane in this example) that is common to the wireless unit 110 and the base of the buildings 125, 130, 135, 140, 145, 150.

It will be appreciated that this modelling can be used to provide standardized comparison testing of a wireless unit by radiating the wireless unit with a quantity of radio signals equal to the number of radio links. Such standardized wireless unit testing may be required as a part of a procurement process by radio system operators, such as AT&T, Sprint, Verizon, T-Mobile, and Vodaphone, just to name a few well-known radio system operators. A particular radio system operator may require channel model wireless unit testing performed according to a standard issued by a standards agency, such as CTIA and 3GPP, wherein the standard incorporates channel models such as those described herein. Alternatively, a radio system operator could require the use of a channel model test method for wireless unit performance testing as described herein, issued by other engineering groups or the operator itself. Each radio signal is generated at its respective angle of arrival with reference to the wireless unit and transmitted by a probe antenna. Each probe radio signal is derived as a modified form of one test signal. The test signal may include information for the wireless unit to decode, allowing the determination of an error rate. The probe radio signals are determined using propagation parameters whose values are determined for each radio set of links for a particular drop. The drops may be determined using a randomized selection process. The angles of arrival and propagation characteristics can then be determined for a large enough number different drops to determine performance of the wireless unit for a particular environment (e.g., urban macro-cell). The angles of arrival and path lengths may be determined by a channel modeling process. The signal characteristics of the modified radio signal transmitted by each probe antenna may be determined from the channel model and specific parameters such as the path lengths of the links. The signal characteristics includes such items as carrier amplitude, carrier phase shift and phase spread, and polarization shift.

In some embodiments, a mathematical model of the geometry of a particular system may be used to analyze the performance characteristics of a wireless unit, which may be for such purposes as optimizing the position of a fixed wireless unit in a system. In such an instance, a mathematical model of the system geometry (for example, the mathematical model of the system shown in FIG. 1), implementation of which is known, can determine the angles of arrival doe different positions of the wireless unit. Probe antennas can then be placed at those angles and test signals used to optimize the location of the wireless unit.

Figure 2:
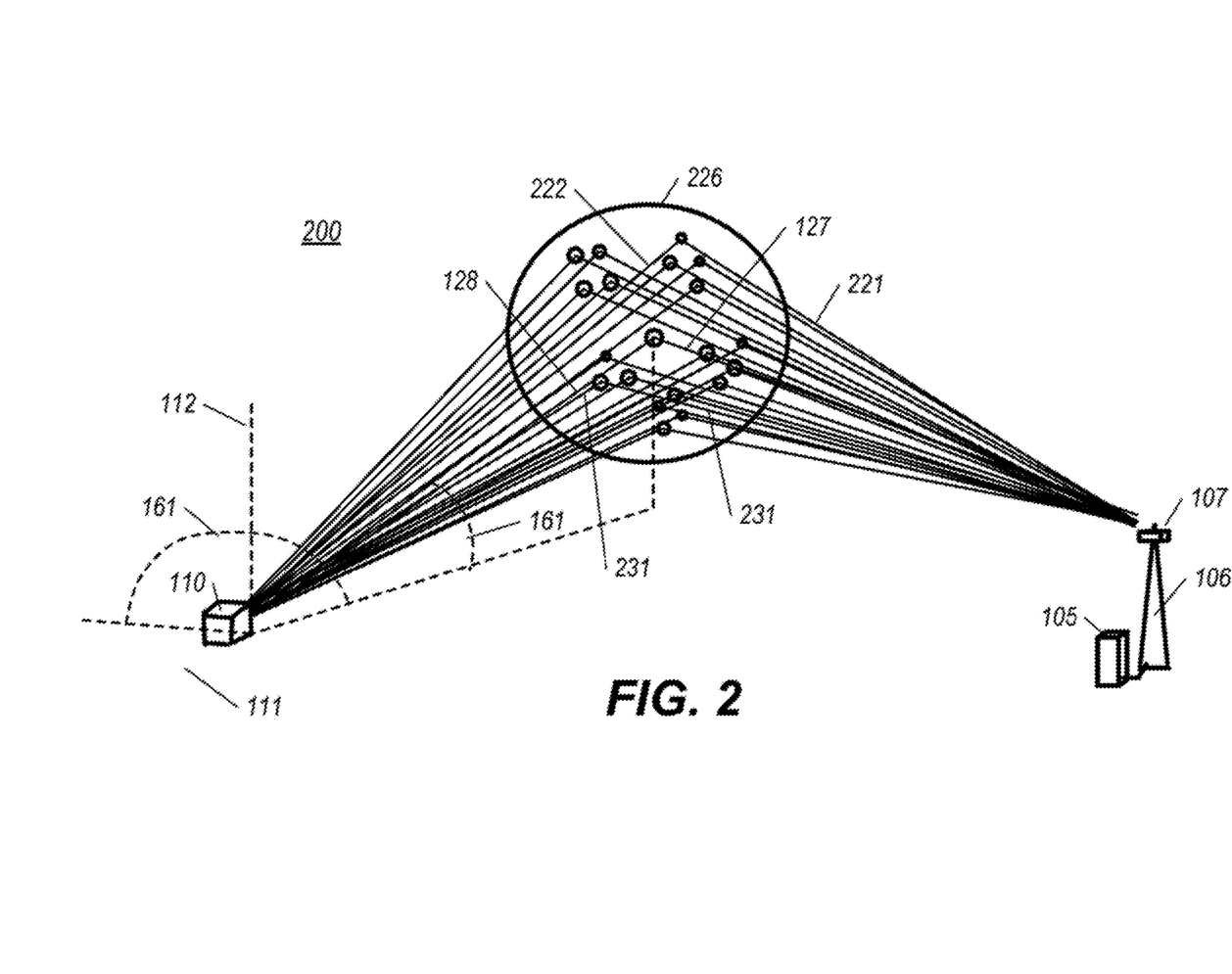
FIG. 2 is a geometric diagram of one cluster of radio rays in the model of the wireless system, in accordance with certain embodiments.

Referring to FIG. 2, a geometric diagram 200 of one cluster 226 of a radio link in the model of the wireless system is shown, in accordance with certain embodiments. The radio link corresponds to path 128. The reflection of a signal at a position such as position 126 in FIG. 1 is enhanced in certain embodiments (e.g., SCME and WINNER II) to include a one or more rays at some or all of the reflection positions. The collection of rays is called a cluster. Each ray is also referred to as a sub-path. This is illustrated in FIG. 2, where reflection position 126 is cluster 226. As shown in FIG. 2, in some embodiments used for standardized testing the clusters may include up to 20 sub-paths (e.g., sub-paths 221-222 and 231-232), each having a small deviation around a parent path. The parent path 127-128 in FIGS. 1 and 2 in some embodiments may be one of the sub paths shown in FIG. 2. In some embodiments the parent path may be determined by an average of the angles of the rays in the cluster.

Figure 3:
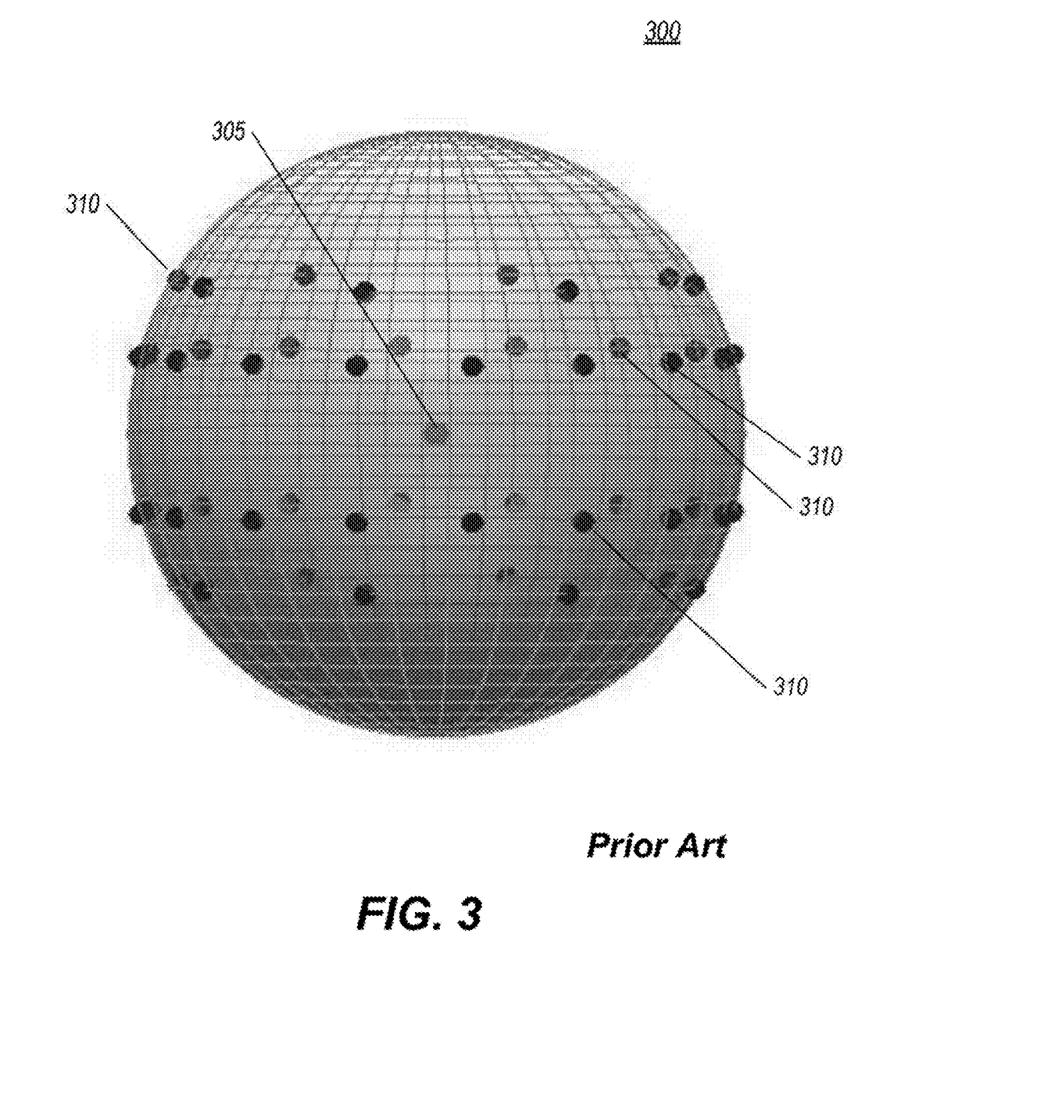
FIG. 3 is a view of a three dimensional geometric representation of a distribution of antenna probes, in accordance with certain prior art embodiments.

Referring to FIG. 3, a view of a three dimensional geometric representation 300 of a distribution of antenna probes is shown, in accordance with certain prior art embodiments. A few of these are identified in FIG. 3 with reference number 310. Prior art solutions providing an environment for determining the performance of a wireless unit in a radio system typically involve placing a wireless unit under test in an anechoic chamber. The anechoic chamber is typically equipped with sufficient probe antennas at defined fixed positions to allow testing of any drop expected to be used for a testing a class of wireless units. During a test, a wireless unit 305 is positioned at a test position in the anechoic chamber. The number of probe antennas required and their fixed positions are determined by the angles of arrival in the channel model being emulated. The fixed positions are at regular intervals, so that the test setup can be used for a wide variety of purposes, which may include system models having angles of arrival at many azimuth angles For more sophisticated radio systems employing multiple-input-multiple-output (MIMO) antenna systems, angles of arrival may also include elevation angles other than +90 degrees. For example, elevations within the ranges of +45 to +135 degrees may occur in some embodiments.

The probe antennas must be located sufficiently apart from each other to achieve an acceptably low level of antenna to antenna coupling. Hence the volume of the sphere upon which the probe antennas are positioned is larger for wireless units requiring a larger volume and is larger when more probe antennas are used. In embodiments that use probe antennas distributed around the test position in patterns, the angle of arrival of the test signal for each radio link in a drop is provided by coupling the test signal to several probe antennas at signal strengths calculated so that the resultant energy comes for the correct angle of arrival. To accomplish this requires that the probe antennas be sufficiently close to each other so that the combined signal is a plane wave at the test volume, but far enough to avoid coupling. All of these constraints result in a relatively large radius of the sphere at which the probe antennas are mounted. For example, 48 probe antenna locations are described in "3D Channel Model Emulation in a MIMO OTA Setup" authored by Wei Fan, Pekka Kyösti, Fan Sun, Jesper Nielsen, Xavier Carreño, Gert F. Pedersen, and Mikael B. Knudsen, 2013, Department of Electronic Systems, Faculty of Engineering and Science, Aalborg University, Denmark.

Figure 4:
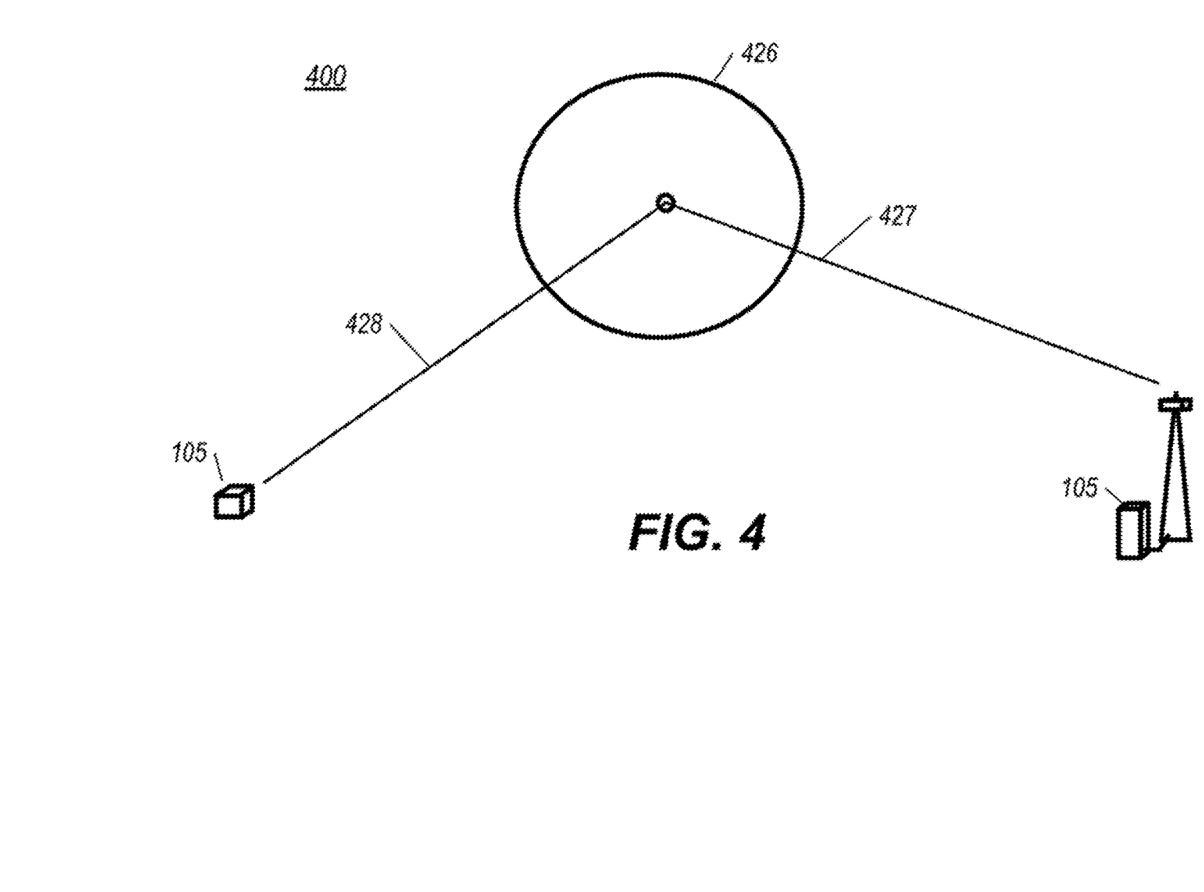
FIG. 4 is a geometric diagram one cluster of radio rays in the model of the wireless system, in accordance with certain embodiments.

Referring to FIG. 4, a geometric diagram 400 of one radio link 427, 428 in the model of the wireless system 100 is shown, in accordance with certain embodiments. The angle of arrival of this radio link is the angle of path 428, which is a consolidated angle of arrival derived from the cluster of rays described with reference to FIG. 2. By using one consolidated angle of arrival derived from the angles of arrivals of all of the sub-paths in each cluster, the quantity of angles of arrival is substantially reduced in comparison to models using radio links having multiple angles of arrival for each cluster. The signal characteristics for the consolidated radio link that now represents a cluster are derived by using a combination of the signal characteristics (e.g., amplitude and phase shift) the signals for each sub-path that have been determined by using the propagation parameters for each ray. The combination may be a combination weighted by amplitude. Testing of models using multiple drops for both approaches (that is, with multiple rays for each cluster versus a consolidated radio link for each cluster) show that the difference in wireless performance is less than +−5% when the consolidated angle of arrival is the average of the angles of arrival of each sub-path. Other versions of consolidated angles of arrival may be used, for example, a consolidated angle of arrival that is the parent angle of arrival, or an amplitude weighted average of the angles of arrival of each ray. The use of a consolidated angle of arrival for each radio link allows for a unique probe positioning technique that greatly reduces the amount of equipment needed to perform wireless unit analysis, as described below. This technique may be used as a modification in standard channel modeling processes.

Figure 5:
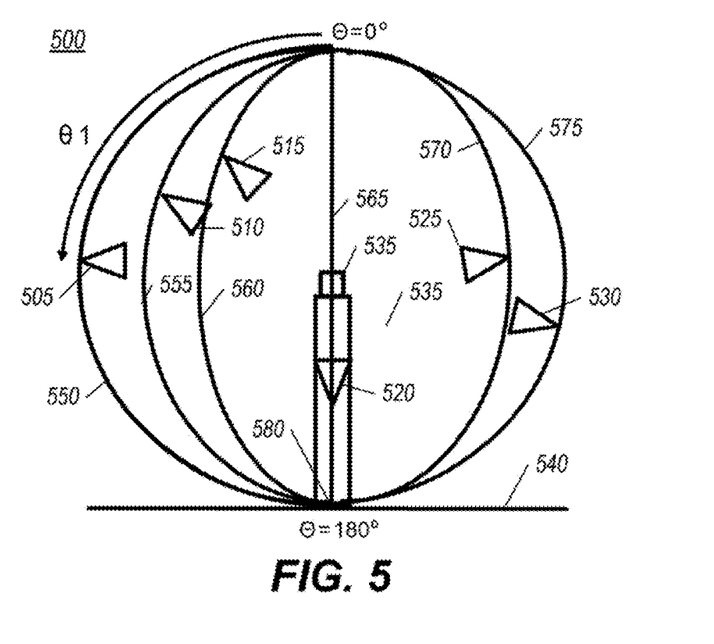
FIGS. 5-6 are two views of a three dimensional geometric representation of a distribution of antenna probes, in accordance with certain embodiments.
Figure 6:
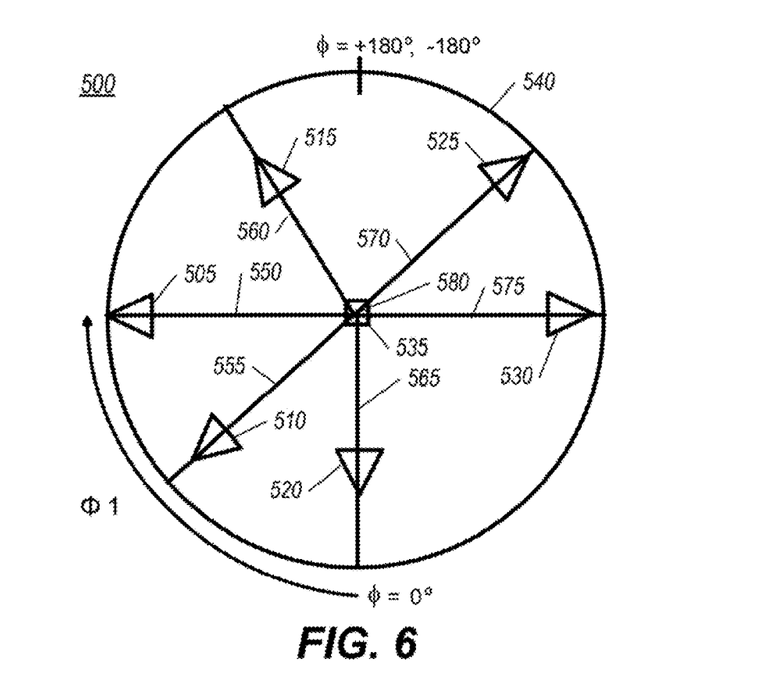

Referring to FIGS. 5-6 two views of a three dimensional geometric representation 500 of a distribution of antenna probes are shown, in accordance with certain embodiments. The view in FIG. 5 is an elevation view of six probe antennas 505, 510, 515, 520, 525, 530. The view in FIG. 6 is a plan view (top view) of the same six probe antennas 505, 510, 515, 520, 525, 530. The probe antennas 505, 510, 515, 520, 525, 530 are positioned equidistant in space from a wireless unit 535. Each probe antenna is positioned at the angle of a radio link of a model radio system. The performance of a wireless unit in a radio system is therefore modeled by a number of probe antennas that is equivalent to the number of angles of arrival in the radio system model and based on the principle that the consolidated angle of arrival is the average of the angel of arrival for a number of sub-paths. The azimuth and elevation positions of the antennas are changed for different instances of wireless devices, reflectors, and transceiver antenna locations. This approach requires fewer probe antennas, and in some embodiment comparisons, far fewer probe antennas than in prior art radio system models in which the prone antennas are at fixed equidistant positions at regular angular intervals, such as the embodiment described with reference to FIG. 3.

In some embodiments the probe antennas 505, 510, 515, 520, 525, 530 are movably attached to a rail having the form of an arc of a sphere that is rotatably attached to a base 540 at point 580. The rails in FIGS. 5 and 6 are illustrated as being approximately 180 degree arcs capable of providing an elevation range close to 180 degrees. In other embodiments, if the radio systems being modeled do not require a full range of elevation angles, the arc shaped rails 550, 555, 560, 565, 570, 575 can be shortened at both ends and be designed to move in a circular path on the base 540, in which case the base would be raised closer to the test position). The range of elevation and azimuth angles needed may be determined by tests defined in one or more radio testing standards, or may be determined by a specific set of variations of geometry of a radio system being modeled. When a two dimensional channel model is emulated, the antenna probes 505, 510, 515, 520, 552, 530 are typically placed at the elevation of 90 degrees. In some embodiments the probe antennas and the wireless unit are within an anechoic chamber. In some embodiments, the probe antennas are dual polarized horn antennas. The use of fewer probe antennas has benefits of reducing cost of emulations because each probe antenna may, for example be driven by a dedicated amplifier. In comparison, when many fixed probe antennas are used, either a larger number of dedicated complex amplifiers are needed and/or high quality radio frequency switches are used, which costs substantially. Also, the distance of the probe antennas from the wireless unit must be larger to prevent antenna coupling, which also increases costs.

The embodiment described here uses six probe antennas for six consolidated radio links. In embodiments used for some standardized testing, complex environments such as urban microcells are modeled as having six main propagation paths from the transceiver to the wireless unit. This number of propagation paths is deemed sufficiently diverse to provide a realistic model without using more paths. The six probe antenna embodiment described with reference to FIGS. 5 and 6 would be sufficient for these 6 path models. The number of probes used for this unique approach of using a set of probe antennas wherein each probe antenna is positioned at an angle of arrival of a radio link can be increased or decreased as needed for other radio system models. Other means of positioning the probe antennas could be used. For example, rails that are straight vertical rails could be used, as long as the probe antennas are able to be directed at the wireless unit 535. The test signals would have to be compensated for the differing distances of the probe antennas, and for embodiments in which an anechoic chamber is used, the chamber would have to be large enough to accommodate rails that are tall enough to achieve a desired range of elevation angles. The size of the chamber would have to allow for reduction of antennas coupling to acceptable levels. A free space arrangement may avoid the use of an anechoic chamber, as long as the strength of interference signals and reflections off of the nearest ground plane and other reflectors are sufficiently small.

It will be appreciated that the technique of radio system modeling described above with reference to FIGS. 1-2, 4-6 can be used for purposes other than comparative testing of wireless units operating in a radio system. For example, the technique could be used to optimize the locations of a transmitter and receiver in a fixed environment, by making measurements of performance of the receiver when the angles of arrival are determined for various relative positions of the transmitter and receiver with the fixed environment. An example is the placement of a transmitter and receiver in an environment for which the position and orientation of the reflecting surfaces is known, and the number of such reflecting surfaces (and therefore, the number of probe antennas) is a cost effective approach. Another example is the placement of a transmitter and receiver in an environment to optimize a given location or range of known locations for a wireless unit.

Figure 7:
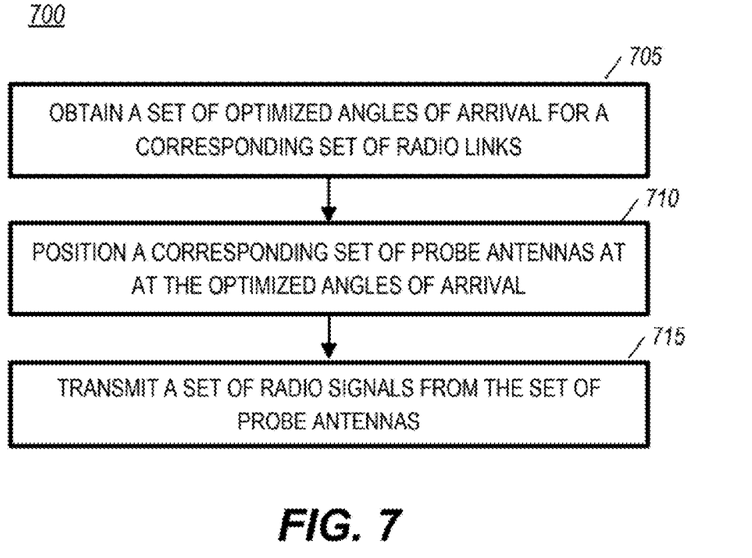
FIG. 7 is a flow chart of some steps of a method for testing a wireless device, in accordance with certain embodiments.

Referring to FIG. 7, a flow chart 700 of some steps of a method for modeling a radio system is shown, in accordance with certain embodiments. At step 705, a set of optimized angles of arrival for a corresponding set of radio links is obtained. The set of radio links model a radio environment of a wireless unit operating at a particular location within in a radio system. In some embodiments, the location is a location of a drop that may be used for performance comparison of wireless units. In some embodiments, the location is a relative location of the wireless unit with reference to the transmitting antenna in a system model used for optimizing relative locations of the wireless unit and the transmitter antenna. In some embodiments the location is a relative location of the wireless unit relative to a system in a system model used to optimize the location of the wireless unit. Other uses may be made of a system model having a wireless unit at a location, such as optimizing the design of the wireless unit. The radio links represent different propagation paths between the wireless unit and another transceiver operating within the radio system. Each optimized angle of arrival represents an angle of arrival of one radio link with reference to the wireless unit. At step 710 a corresponding set of probe antennas is positioned. Each probe antenna is positioned at a corresponding one of the set of optimized angles of arrival. At step 715 a corresponding set of probe radio signals is transmitted from the set of probe antennas. In some embodiments, the optimized angles of arrival may include sub-paths. In those embodiments the optimized angles of arrival are derived from the sub-paths. Otherwise, each angle of arrival is the optimized angle of arrival.

Figure 8:
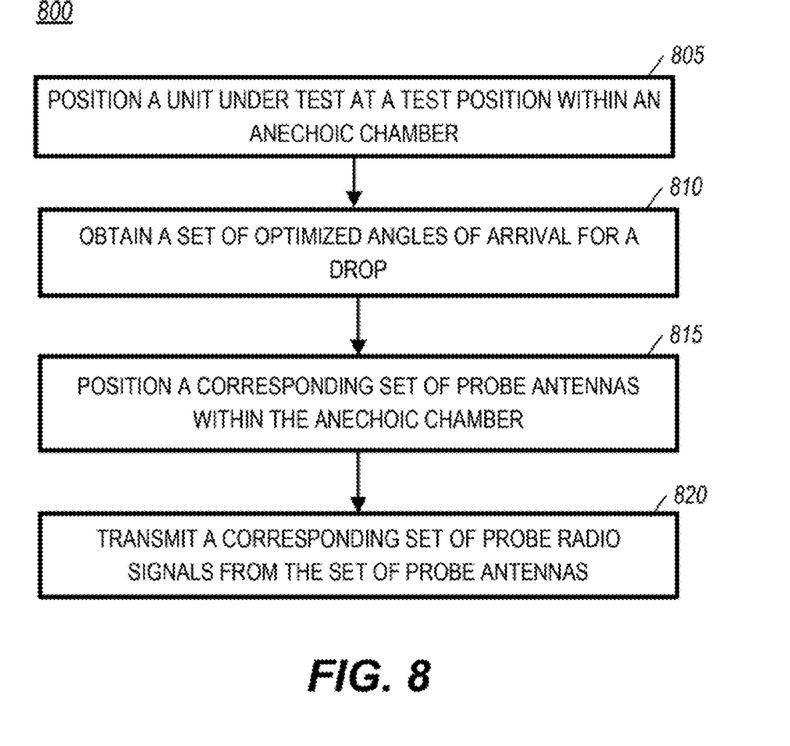
FIG. 8 is a flow chart of some steps of a method for testing a wireless device, in accordance with certain embodiments.

Referring to FIG. 8, a flow chart 800 of some steps of a method for modeling a radio system is shown, in accordance with certain embodiments. At step 805 wireless a wireless unit under test is positioned as a test position within an anechoic chamber. At step 810, a set of optimized angles of arrival for a particular drop is obtained. A channel model of a radio system that includes a wireless unit and a transceiver that transmits radio signals to the wireless unit is used to determine the angles of arrival. At step 815, a corresponding set of probe antennas are positioned within the anechoic chamber. Each probe antenna is positioned at one of the set of optimized angles of arrival. At step 820, a test is performed using a corresponding set of probe radio signals that is transmitted from the set of probe antennas. Each probe radio signal is a modified form of one selected test signal. Each modification is defined by the channel model.

Figure 9:
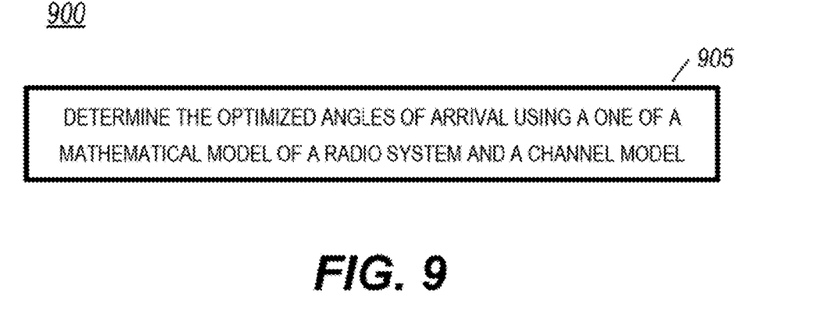
FIGS. 9-11 are each a flow chart of one step of the methods described with reference to FIGS. 7 and 8.

Referring to FIG. 9, a flow chart 900 of one step of a method for modeling a radio system is shown, in accordance with certain embodiments. The method may be one of the methods described with reference to FIGS. 7 and 8. At step 905, the optimized angle of arrival of each radio link referred to in step 705 (FIG. 7) and step 810 (FIG. 8) is derived from one of a mathematical model and a channel model.

Figure 10:
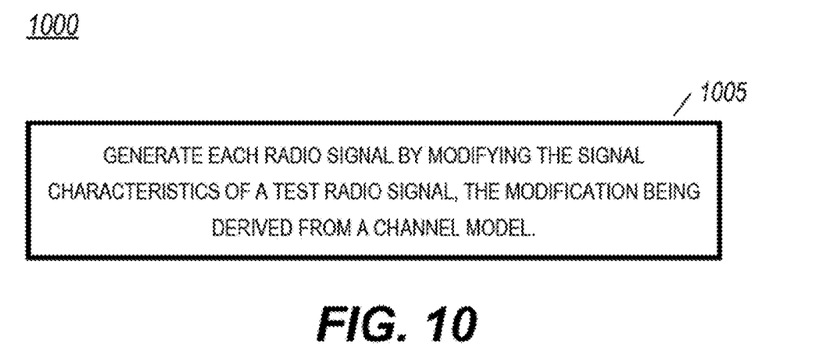

Referring to FIG. 10, a flow chart 1000 of one step of a method for modeling a radio system is shown, in accordance with certain embodiments. The method may be one of the methods described with reference to FIGS. 7 and 8. At step 1005, each radio signal is generated by modifying the signal characteristics of a test radio signal, wherein the modification is derived from a channel model. The channel model establishes propagation parameters associated with the radio link for a particular location, or drop, of the wireless unit.

Figure 11:
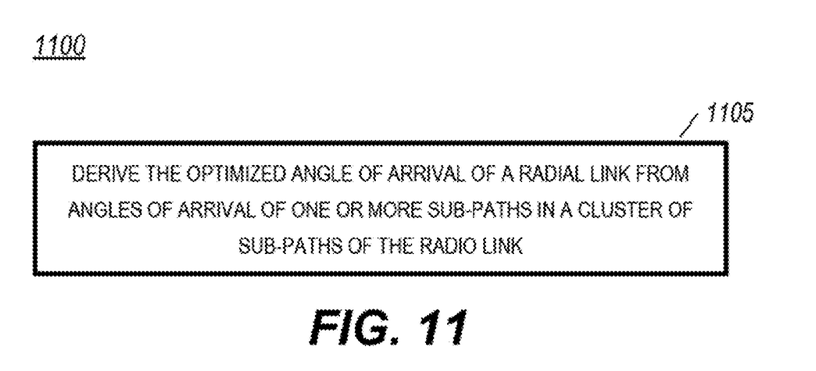

Referring to FIG. 11 a flow chart 1100 of one step of a method for modeling a radio system is shown, in accordance with certain embodiments. The method may be one of the methods described with reference to FIGS. 7 and 8. At step 1105, the optimized angle of arrival of a radio link is derived from angles of arrival of one or more sub-paths in a cluster of sub-paths of the radio link, wherein each sub-path has an angle of arrival with reference to the wireless device.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   obtaining a set of optimized angles of arrival for a corresponding set of radio links, wherein the set of radio links model a radio environment of a wireless unit operating at a particular location within a radio system, and each radio link represents a different propagation path between the wireless unit and a transmitting antenna operating within the radio system, and wherein each optimized angle of arrival represents an angle of arrival of one radio link with reference to the wireless unit;
   positioning a corresponding set of probe antennas, each probe antenna being positioned at a corresponding one angle of the set of optimized angles of arrival;
   generating a corresponding set of probe radio signals by modifying signal characteristics of a test signal using one of a mathematical model and a channel model; and
   transmitting a corresponding set of probe radio signals from the set of probe antennas.

2. The method according to claim 1, further comprising determining the optimized angle of arrival of each link by one of a mathematical model of a radio system and a channel model of a radio system.

3. The method according to claim 2, wherein the channel model of a radio system is a channel model required by a radio system operator for use in wireless unit testing.

4. The method according to claim 2, wherein the channel model is defined by a standard issued by one of 3GPP, WINNER, and CTIA.

5. The method according to claim 1, wherein the wireless unit and the probe antennas are positioned within an anechoic chamber.

6. The method according to claim 1, further comprising deriving each optimized angle of arrival from angles of arrival of one or more sub-paths in a cluster of sub-paths of a radio link.

7. A method, comprising:
   positioning a wireless unit under test at a test position within an anechoic chamber;
   obtaining a set of optimized angles of arrival for a particular drop that is determined by a channel model of a radio system that includes a wireless unit and a transceiver that transmits radio signals to the wireless unit;
   positioning a corresponding set of probe antennas within the anechoic chamber, each probe antenna being positioned at one of the set of optimized angles of arrival;
   generating a corresponding set of probe radio signals by modifying signal characteristics of a test signal using one of a mathematical model and a channel model; and
   performing a test using the corresponding set of probe radio signals transmitted from the set of probe antennas, wherein each probe radio signal is a modified form of a test signal.

8. The method according to claim 7, wherein the channel model of a radio system is a channel model required by a radio system operator for use in wireless unit testing.

9. The method according to claim 7, wherein the channel model is defined by a standard issued by one of 3GPP, WINNER, and CTIA.

10. The method according to claim 7, further comprising deriving an optimized angle of arrival from angles of arrival of one or more sub-paths in a cluster of sub-paths of a radio link.

11. An apparatus, comprising:
   an anechoic chamber;
   a test position for a wireless unit under test; and
   a set of probe positioning devices, each probe positioning device capable of positioning one probe antenna over a range of azimuth angles and a range of elevation angles, wherein each probe antenna of the set of probe positioning devices is set at a different one of a set of optimized angles of arrival (AoA) that correspond to one set of radio links, wherein the set of optimized AoAs have been generated by a model that simulates the wireless unit under test operating in a radio system, and
   a set of signal generators, each of which generating a probe radio signal by modifying signal characteristics of a test signal using one of a mathematical model and a channel model;
   wherein the radio links are links representing different propagation paths between the wireless unit under test and another transceiver operating within the radio system, and wherein each optimized AoA is an angle determined by the model to optimally represent an AoA of one link with reference to the wireless unit under test.

12. The apparatus according to claim 11, wherein the range of azimuth angle and the range of elevation angles are determined from at least one radio testing standard, a geometric model of a radio system, +−180 degrees of azimuth, and +−180 degrees of elevation.

13. The apparatus according to claim 11, further comprising determining the optimized angle of arrival of each radio link by one of a mathematical model and a channel model.

14. The apparatus according to claim 11, wherein the channel model of a radio system is a channel model required by a radio system operator for use in wireless unit testing.

15. The apparatus according to claim 11, wherein the channel model is defined by a standard issued by one of 3GPP, WINNER, and CTIA.

16. The apparatus according to claim 11, further comprising deriving each optimized angle of arrival from angles of arrival of one or more sub-paths in a cluster of sub-paths of a radio link.

* * * * *